(12) United States Patent
Jeng et al.

(10) Patent No.: US 9,116,579 B2
(45) Date of Patent: Aug. 25, 2015

(54) MIMO SONIC TOUCH PANEL AND MIMO SMART SOUND POTENTIAL SERVER

(71) Applicants: Yue-Shih Jeng, Zhubei (TW); Wei-Chih Liu, Taichung (TW); Tien-Rong Lu, Tainan (TW)

(72) Inventors: Yue-Shih Jeng, Zhubei (TW); Wei-Chih Liu, Taichung (TW); Tien-Rong Lu, Tainan (TW)

(73) Assignees: Yue-Shih Jeng; Wei-Chih Liu; Tien-Rong Lu

( * ) Notice: Subject to any disclaimer, the term of this patent is extended or adjusted under 35 U.S.C. 154(b) by 274 days.

(21) Appl. No.: 13/756,535

(22) Filed: Feb. 1, 2013

(65) Prior Publication Data

US 2013/0194241 A1 Aug. 1, 2013

Related U.S. Application Data

(60) Provisional application No. 61/593,852, filed on Feb. 1, 2012.

(51) Int. Cl.
*G06F 3/043* (2006.01)

(52) U.S. Cl.
CPC .............. *G06F 3/043* (2013.01); *G06F 3/0436* (2013.01)

(58) Field of Classification Search
CPC ......... G06F 3/041; G06F 3/042; G06F 17/28; H05K 3/10
See application file for complete search history.

(56) References Cited

U.S. PATENT DOCUMENTS 7,918,019 B2 * 4/2011 Chang et al. ..................... 29/846
2011/0018825 A1 * 1/2011 Kondo et al. .................. 345/173

* cited by examiner

*Primary Examiner* — Michael Faragalla
(74) *Attorney, Agent, or Firm* — Cheng-Ju Chiang

(57) ABSTRACT

A multi input and multi output (MIMO) sonic touch panel includes at least a sonic touch module and a display module. The sonic touch module includes a first carrier layer, a first vibrating layer and a first conducting layer. The first vibrating layer is disposed at the first carrier layer. The first conducting layer is disposed at the first carrier layer or the first vibrating layer and coupled with the first vibrating layer. The first conducting layer and the first vibrating layer are located at the same side or the opposite side of the first carrier layer. The display module is disposed opposite to the sound touch module. Besides, a MIMO smart sound potential server is also disclosed.

20 Claims, 13 Drawing Sheets

MIMO SONIC TOUCH PANEL AND MIMO SMART SOUND POTENTIAL SERVER

CROSS REFERENCE TO RELATED APPLICATIONS

The non-provisional patent application claims priority to U.S. provisional patent application with Ser. No. 61/593,852 filed on Feb. 1, 2012. This and all other extrinsic materials discussed herein are incorporated by reference in their entirety.

BACKGROUND OF THE INVENTION

1. Field of Invention

The invention relates to a multi-input and multi-output touch panel and a multi-input and multi-output smart sound potential server.

2. Related Art

With the development of science and technology, the functionalities of the electrical products are keep rising and pursuing the convenience. As a consequence, the electrical peripheral technology also pursues to improve the efficiency of the user-computer. Among these technologies, touch technology is one of the well-developed and user-friendly user-computer technologies. Nowadays, the touch technology has been widely used in the many electronic products, such as global positioning system, personal digital assistant, cellular phone, palm-size PC and information appliance. With a touch panel planted in these electrical products, the user could operate or gives sound potentials via touching.

The present main stream of the touch panel is the capacitive-type touch panel. U.S. Pat. No. 7,918,019, B2 shows a way to manufacture a thin membrane touch panel. The capacitive-type touch panel not only acts as a display panel, but also includes a multi-touch function. Nevertheless, the touch sensing panel can only sense the touching or gesture of the user and react correspondingly. In other way of speaking, it is designed only for mono-function. Other functions such as the sonic output and control, sonic input sensing and identifying (i.e., multiple-input and multi-output, or in other words multi-tasking functionality) could not be realized and satisfied by the conventional touch panel. Therefore, the intelligent devices nowadays can only passively provide the services which are according to the user's setting. These intelligent devices can't concern or understand the intention and behavior trends of the user, in order to actively understand the need of the user. Accordingly, providing a better and flexible service for the user, and provide an active and effective aid during major accidents would be the objections of the present invention.

SUMMARY OF THE INVENTION

An objection of the present invention is to provide a multi-input and multi-output (MIMO) touch panel and a multi-input and multi-output (MIMO) smart sound potential server for integrating sound input sensing, voice identifying, acoustic controlling, information displaying and multi-touching function. Therefore, the (MIMO) touch panel and the (MIMO) smart sound potential server could realize and embody the abovementioned functions. Therefore, the invention could create a new experience and new application, simplify volume, the structure and lower the cost of the MIMO sonic touch panel and smart sound potential server. Accordingly, the present invention could provide a better, flexible, active and effective smart device for the user.

To achieve the above objective, the present invention discloses a multi-input and multi-output (MIMO) sonic touch panel, comprising at least one sonic touch module and a display module. The sonic touch module comprises a first carrier layer, a first vibrating layer and a first conducting layer. The first vibrating layer is disposed on the first carrier layer. The first conducting layer is disposed on the first carrier layer or the first vibrating layer and is coupled with the first vibrating layer. The first conducting layer and the first vibrating layer are disposed on the same side or on the opposite sides of the first carrier layer. The display module is disposed opposite to the sonic touch module.

To achieve the above objective, the present invention also discloses a multi-input and multi-output (MIMO) smart sound potential server, which comprises an MIMO sonic touch panel and a processing module. The MIMO sonic touch panel comprises at least one sonic touch module for at least detecting a surrounding background noise or a user's sound potential. The processing module is coupled with the MIMO sonic touch panel. When the user receives a call, the processing module outputs an optimized sound effect according to the surrounding background noise or the user's sound potential.

As mentioned above, the present invention provides a MIMO sonic touch panel a MIMO smart sound potential server, which combine the sonic sensing, sonic motivating, information displaying and touch sensing within a module, a panel and a server. Therefore, the invention could create a new experience and new application, simplify volume, the structure and lower the cost of the MIMO sonic touch panel and smart sound potential server. Accordingly, the present invention could provide a better, flexible, active and effective smart device for the user.

BRIEF DESCRIPTION OF THE DRAWINGS

The invention will become more fully understood from the detailed description and accompanying drawings, which are given for illustration only, and thus are not limitative of the present invention, and wherein.

DETAILED DESCRIPTION OF THE INVENTION

The present invention will be apparent from the following detailed description, which proceeds with reference to the accompanying drawings, wherein the same references relate to the same elements.

Figure 1A:
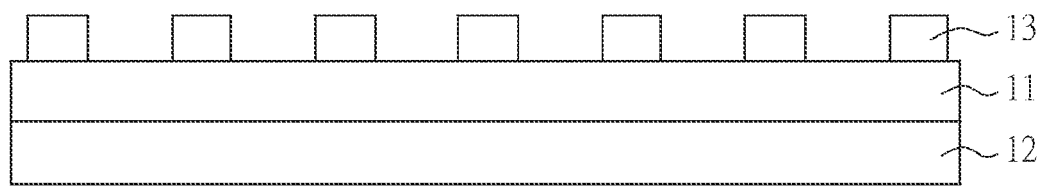
FIG. 1A is a schematic view of a first embodiment of a sonic touch module of the present invention.

Please refer to FIG. 1A, which shows a schematic view of a first embodiment of a sonic touch module 1a of the present invention. The sonic touch module 1a comprises a first carrier layer 11, a first vibrating layer 12 and a first conducting layer 13.

With reference to FIG. 1A, the first vibrating layer 12 is disposed on the first carrier layer 11, and the first conducting layer 13 is disposed on the first carrier layer 11 or the first vibrating layer 12. The first conducting layer 13 is coupled with the first vibrating layer 12. Besides, the first conducting layer 13 and the first vibrating layer 12 are disposed on the same side or on the opposite side of the first carrier layer 11. In the present embodiment, the first vibrating layer 12 and the conducting layer 13 are respectively disposed on the bottom surface and the upper surface of the first carrier layer 11. In other ways of speaking, the present embodiment shows an example of placing the first conducting layer 13 and the first vibrating layer 12 on the opposite side of the first carrier layer 11. Hereby, the first conducting layer 13 and the first vibrating layer 12 could connect via wire or by electromagnetic coupling means, but are not necessary limited to. Besides, the first vibrating layer 12 could be laminated on the first carrier layer 11 and contact directly to the bottom surface of the first carrier layer 11, or the vibrating layer 12 could be adhesive on the first carrier layer 11 via an adhesive layer. Furthermore, in other embodiments, the first vibrating layers 12 and the first carrier layer 11 could switch places, in other ways of speaking; the first conducting layer 12 could be disposed on the first vibrating layer 12, which could be disposed on the first carrier layer 11. Therefore, the first conducting layer 13 and the first vibrating layer 12 would be disposed on the same side of the first carrier layer 11. Yet there also exist another embodiment of the present invention that comprises multiple sonic touch modules 1a, the first vibrating layers 12 and the first conducting layers 13 could dispose on the same first carrier layer 11.

The first carrier layer 11 could be made from a light transmissive or opaque material, such as polymer (e.g., Polyethylene terephthalate, PET) or silicon dioxide, but not limited to. The first vibrating layer 12 could be made of a light transmissive material, such as electrets (which is made of electret material), but not limited to. Wherein, a polarized electret could turn into a permanent polarization electric, and includes electrodes on the surface. The electrets could be made of silicon dioxide or composite material, such as fluorinated ethylene propylene (FEP), copolymer, polytetraflouroethylene (PTFE), polyvinylidene fluoride (PVDF), polyimide (PI), cyclo-olefin copolymer, polypropylene (PP) or polyethylene (PE), but not limited to. Furthermore, the first conducting layer 13 comprises a continuous conducting layer or a non-continuous patterned conducting layer. The present embodiment shows a non-continuous patterned conducting layer as an example, and the first conducting layer 13 could be a light transmissive conductive membrane (e.g., ITO or IZO) or other conductive material (e.g., silver, copper, a light transmissive carbon nano tube or graphite.) Further, the first conducting layer 13 could be made from typical coating process, for example, deposition, sputtering, chemical vapour deposition (CVD), electroplating, electroless plating or coating, but not limited to. The sonic touch module 1a comprises a sonic wave sensing function (e.g., sonic sensor, such as microphone), a sonic motivating function (e.g., sonic motivator, such as speaker) and a touch sensing function (e.g., touch panel). The details description of the sonic wave sensing function, the sonic motivating function and the touch sensing function would be introduced below.

First, take sonic wave sensing function as an example, the first conducting layer 13 could provide a steady electrostatic field, and the electret of the first vibrating layer 12 could provide a stable structure. Wherein, in the present embodiment the patterned first conducting layer 13 includes two different and isolated electrodes gathering, which could form a steady electrostatic field therebetween. When the sonic touch module 1a receives surrounding sounds, the electret of the first vibrating layer 12 would be vibrated accordingly, and the electrostatic field would also change correspondingly. The first conducting layer 13 could generate different currents according to different vibrating frequencies, which these current would be transferred by a voice identifying module (not shown) to digital signals in order to let the sonic touch module 1a embodies voice receiving function similar to the microphone.

Secondly, as for sonic motivating function (such as speaker), when the first conducting layer 13 of the sonic touch module 1a receives two different current signals (more specific, the two different electrodes gathering receive the two different current signals), the first vibrating layer 12 (more specific, the electrets) would vibrate correspondingly, and export sonic wave corresponding to the vibration. By the above arrangements, the sonic touch module 1a could embody voice emissive function similar to the speaker.

Last but not least, below would give further details of the touch sensing function of the sonic touch module 1a. When fingers of the user or any object contact or touch any position of the two electrodes gathering of the first conducting layer 13, the capacitive of the touch position would vary. By calculating the change of capacitive, the touch position of the fingers or object would be verified. Further, in other aspect of the present invention, the touch sensing could be other than capacitive type, it could be sliding or wiping type, knocking type or other equivalent touch sensing type, and it could be single-touch or multi-touch type.

Referring to FIG. 1B to 1K respectively show schematic views of different sonic touch modules of the first embodiment of the present invention.

Figure 1B:
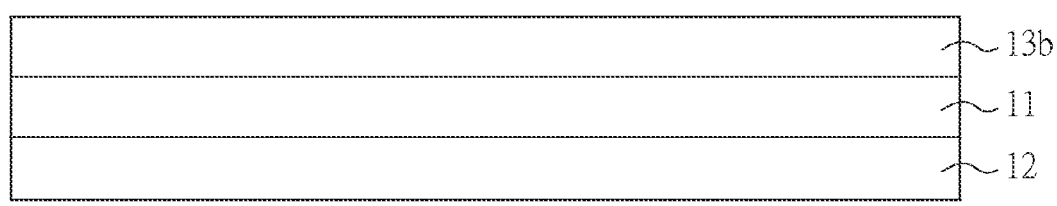
FIG. 1B to FIG. 1K are schematic views showing different sonic touch modules of the first embodiment of the present invention.

As depicted in FIG. 1B, the crucial different between the sonic touch module 1b and the sonic touch module 1a of FIG. 1A is that the first conducting layer 13b of the sonic touch module 1b is sonic wave sensor for sensing the frequency and vibration of sonic wave. The sonic wave sensor is conductive and could be made of conductive material, composite material or dielectric material. The composite material mentioned here is the exact material as the first vibrating layer 12. Besides, the sonic wave sensor (i.e., the first conducting layer 13b) comprises single or multi-ends electrode, and the electrodes could be continuous or a non-continuous conducting pattern, which is not limited herein. Moreover, the first vibrating layer 12 (more specific, the electrets) has electrode on the surface (not shown), and the first conducting layer 13b and the first vibrating layer 12 could switch places.

When the sonic touch module 1b sensing sonic wave, different intensity of sound would let the sonic wave sensor (i.e., the first conducting layer 13b) generates different value of vibration intensity, which the vibration intensity would be therefore transferred into digital signals and verified. In other words, the sonic touch module 1b could receive sound just as microphone. Besides, when the sonic wave sensor receives current signals, the first vibrating layer 12 would vibrate accordingly and out sound, which similar to conventional speaker. In addition, when fingers of the user or any object contact or touch the sonic touch module 1b, the pressure at the contacting position generates a current signal correspondingly, and the contacting position could be detected. The above touch panel is a piezoelectric touch panel, in some aspects; the touch sensing type could be sliding or wiping type, knocking type or other equivalent touch sensing type. The detailed descriptions of the sonic touch module 1b of are similar to the sonic touch module 1a of the first embodiment, therefore would be omitted for clarity and conciseness.

Figure 1C:
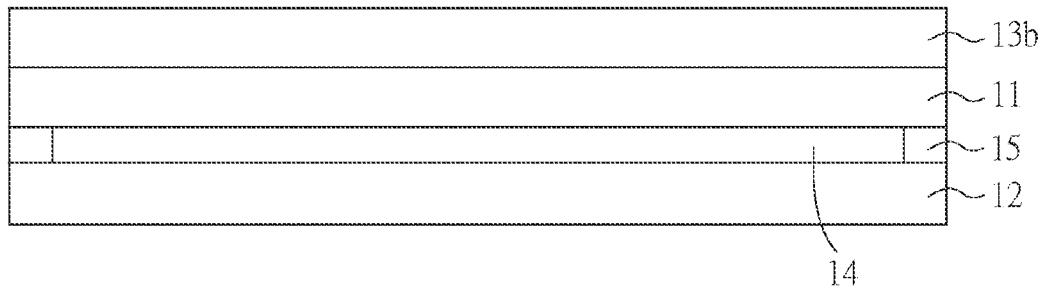

Please refer to FIG. 1C, the crucial different between the sonic touch module 1c and the sonic touch module 1b of FIG. 1B is that the sonic touch module 1c further comprising a compartment 14 and a sealing structure 15. As shown in FIG. 1C, in the present embodiment, the sealing structure 15 is disposed between the first carrier layer 11 and the first vibrating layer 12 for forming the compartment 14 therebetween. In other words, the compartment 14 is formed between the first carrier layer 11 and the first vibrating layer 12, and the sealing structure 15, the first carrier layer 11 and the first vibrating layer 12 together formed the compartment 14. In some embodiments, the sealing structure 15 could be disposed between the first carrier layer 11 and the first conducting layer 13b for forming the compartment therebetween. That is, the sealing structure 15, the first carrier layer 11 and the conducting layer 13b together formed the compartment 14, in which provides the conducting layer 13b (more specific, the sonic wave sensor) vibration space. The detailed descriptions of the sonic touch module 1c of are similar to the sonic touch modules 1b, therefore would be omitted for clarity and conciseness.

Figure 1D:
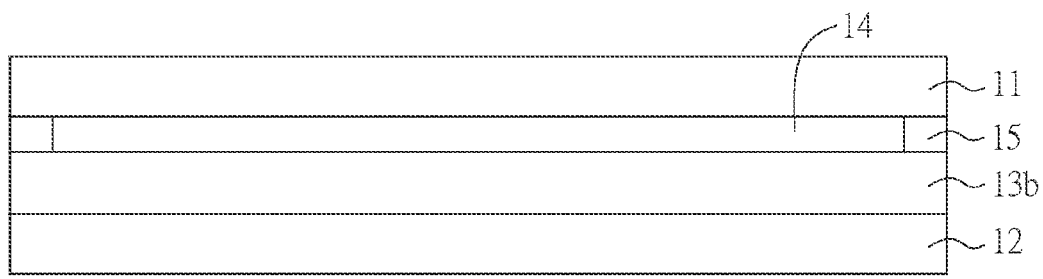

Please refer to FIG. 1D, the crucial different between the sonic touch module 1d and the sonic touch module 1b of FIG. 1B is that the sonic touch module 1d are constructed by the first vibrating layer 12, the first conducting layer 13b (the sonic wave sensor), a compartment 14 and a sealing structure 15 and the first carrier layer 11 respectively from top to bottom. The sealing structure 15, the first carrier layer 11 and the conducting layer 13b together formed the compartment 14, in which provides the conducting layer 13b (more specific, the sonic wave sensor) vibration space. The detailed descriptions of the sonic touch module 1s of are similar to the sonic touch modules 1b, therefore would be omitted for clarity and conciseness.

Figure 1E:
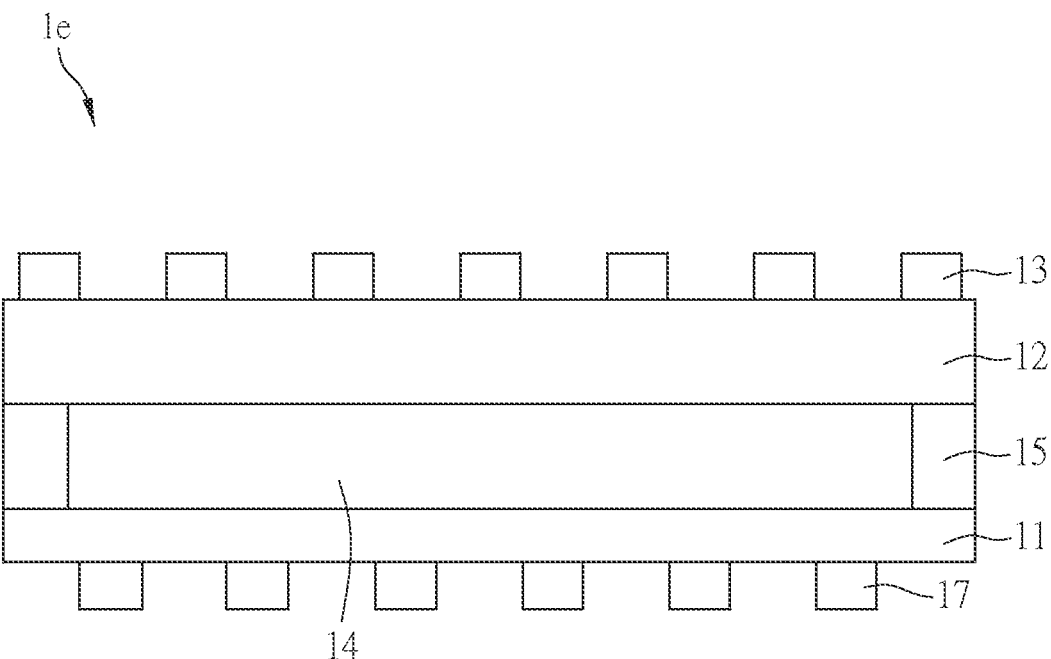

As depicted in FIG. 1E, the crucial different between the sonic touch module 1e and the sonic touch module 1a of FIG. 1A is that the first conducting layer 13 (a patterned conducting layer) of the sonic touch module 1d is disposed on the first vibrating layer 12, which is disposed on the first carrier layer 11. In this embodiment, the first conducting layer 13 and the first vibrating layer 12 are disposed on the same side of the first carrier layer 11. The compartment 14 is formed between the first carrier layer 11 and the first vibrating layer 12, and the sealing structure 15, the first carrier layer 11 and the first vibrating layer 12 together formed the compartment 14. Furthermore, the sonic touch module 1d could further comprises a second conducting layer 17, which is disposed on the first carrier layer, more specific, is disposed on the bottom surface of the first carrier layer 11. The first and the second conducting layers 13, 17 are disposed on the opposite side of the first carrier layer 11. Besides, although second conducting layer 17 of the present embodiment is a non-continuous patterned conducting layer, in other aspects, the second conducting layer 17 could be a continuous conducting layer.

First, in FIG. 1E, take sonic wave sensing function (such as sonic sensor) as an example, the first and the second conducting layer 13, 17 could provide a steady electrostatic field. When the electret of the first vibrating layer 12 receives surrounding sounds, the first conducting layer 13 would vibrate correspondingly (the compartment 14 further provides a vibration space), and the electrostatic field provided by the first and the second conducting layer 13, 17 would also change correspondingly. The first and the second conducting layer 13, 17 could generate different current according to different vibrating frequencies, which these currents would be transferred by a voice identifying module (not shown) to digital signals in order to let the sonic touch module 1e embodies voice receiving function similar to the microphone.

Secondly, as for sonic motivating function (such as sonic motivator), when the first and second conducting layer 13, 17 of the sonic touch module 1a would respectively receive different current signals, the first vibrating layer 12 (more specific, the electrets) would vibrate correspondingly, and export sonic wave corresponding to the vibration. By the above arrangements, the sonic touch module 1a could embody voice emissive function similar to the speaker.

Last but not least, below would give further details of the touch sensing function of the sonic touch module 1e. When fingers of the user or any object contact or touch any position on the first and the second conducting layer 13, 17, the capacitive of the touch position would vary. By calculating the change of capacitive, the touch position of the fingers or object would be verified. Further, in other aspects of the present invention, the touch sensing could be other than capacitive type, it could be sliding or wiping type, knocking type or other equivalent touch sensing type, and it could be single-touch or multi-touch type.

Figure 1F:
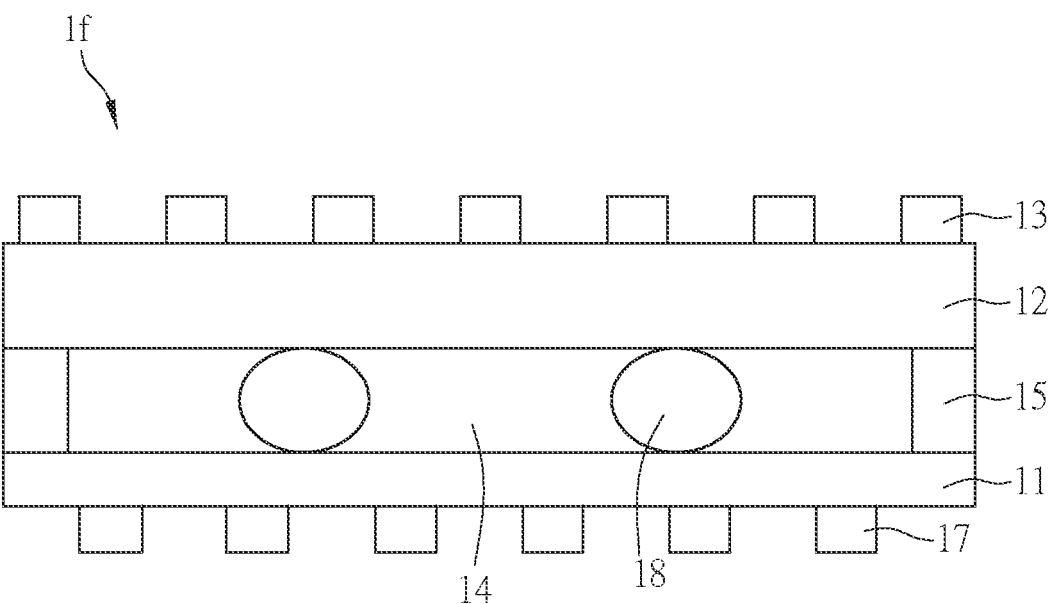

Please refer to FIG. 1E again, the crucial different between the sonic touch module 1e and the sonic touch module 1f of FIG. 1F is that the compartment 14 of the sonic touch module 1f further comprises at least one supporting structure 18, which could be made of granule material or adhesive material. For example, the present invention includes multiple (two) spherical supporting structure 18. The detailed descriptions of the sonic touch module 1e, 1f of are similar to the sonic touch module 1a of the first embodiment, therefore would be omitted for clarity and conciseness.

Figure 1G:
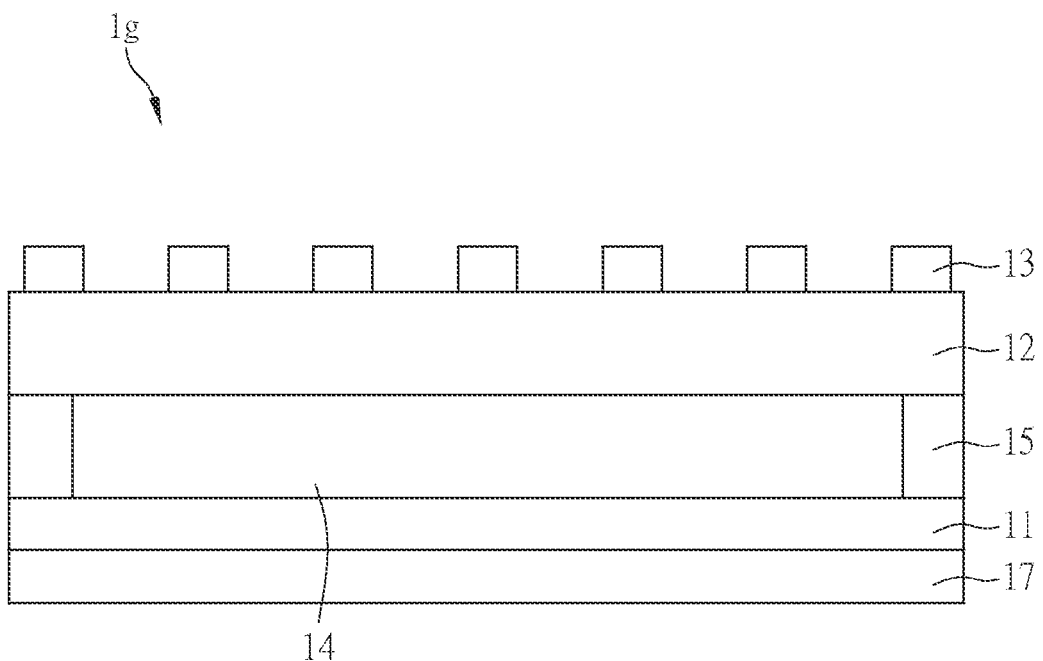

As depicted in FIG. 1G, the crucial different between the sonic touch module 1e and the sonic touch module 1g is that the second conducting layer 17 of the sonic touch module 1g is a continuous conducting layer. Further, the first and the second conducting layer 13, 17 could as electrodes to input or output the signal. The second conducting layer 17 could be a single-touch or multi-touch functional layer, and could be a resistance-type or a capacitive type touch sensing layer. Furthermore, the second conducting layer 17 could be made of a light transmissive conductive membrane (e.g., ITO or IZO) or other conductive material (e.g., silver, copper, a light transmissive carbon nano tube or graphite.) In another aspect, the compartment 14 of the sonic touch module 1g could also comprise a supporting structure. The detailed descriptions of the sonic touch module 1g of are similar to the sonic touch module 1e, therefore would be omitted for clarity and conciseness.

Figure 1H:
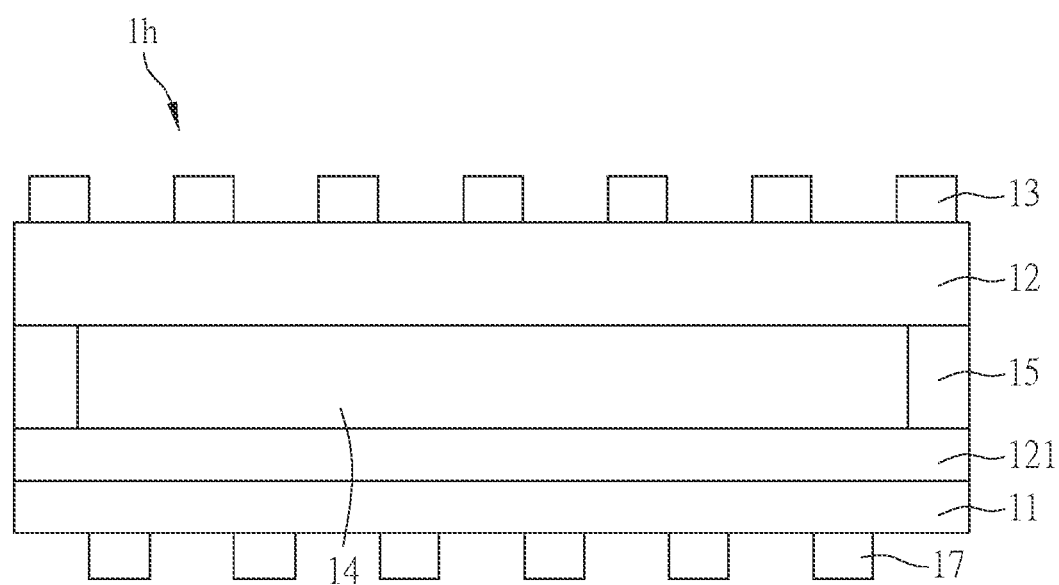

Please refer to FIG. 1H, the crucial different between the sonic touch module 1h and the sonic touch module 1e is that the sonic touch module 1h further comprises a second vibrating layer 121, which is disposed on the first carrier layer 11 and opposite to the first vibrating layer 12. The sealing structure 15 is disposed between the first and the second vibrating layers 12, 121 for forming the compartment 14 therebetween. In another aspect, the compartment 14 of the sonic touch module 1h could also comprise a supporting structure. The detailed descriptions of the sonic touch module 1h of are similar to the sonic touch module 1e, therefore would be omitted for clarity and conciseness.

Figure 1I:
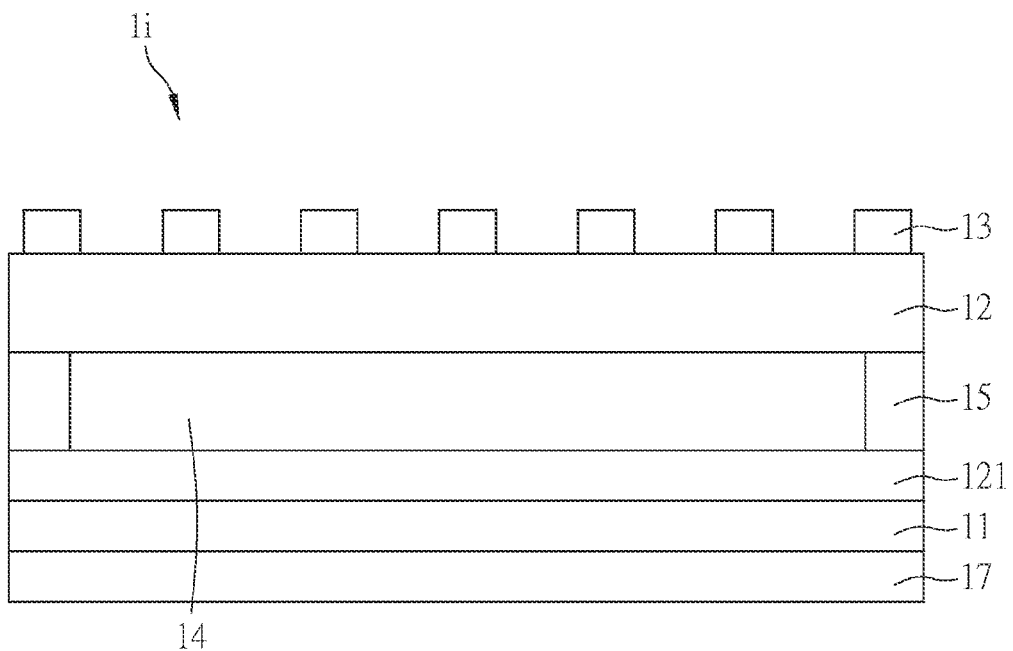

As depicted in FIG. 1I, the crucial different between the sonic touch module 1i and the sonic touch module 1h is that the second conducting layer 17 of the sonic touch module 1i is a continuous conducting layer. Further, the first and the second conducting layer 13, 17 could as electrodes to input or output the signal. The second conducting layer 17 could be a single-touch or multi-touch functional layer, and could be a resistance-type or a capacitive type touch sensing layer. Furthermore, the second conducting layer 17 could be made of a light transmissive conductive membrane (e.g., ITO or IZO) or other conductive material (e.g., silver, copper, a light transmissive carbon nano tube or graphite.) In another aspect, the compartment 14 of the sonic touch module 1i could also comprise a supporting structure. The detailed descriptions of the sonic touch module 1i of are similar to the sonic touch module 1h, therefore would be omitted for clarity and conciseness.

Figure 1J:
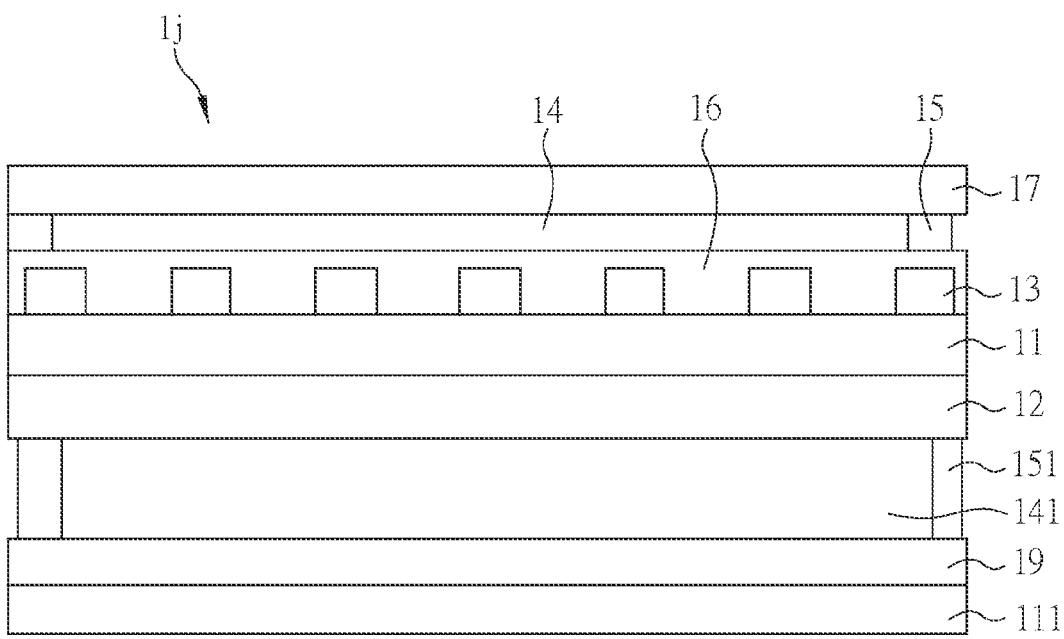

Please refer to FIG. 1J, the crucial different between the sonic touch module 1j and the sonic touch module 1a is that the sonic touch module 1j further comprising an adhesive layer 16, a compartment 14, a second conducting layer 17 and a sealing structure 15. The adhesive layer 16 covers the first conducting layer 13 and contacts the first carrier layer 11. Further, the second conducting layer 17 is disposed on the adhesive layer 16, wherein the first and the second conducting layer 13, 17 are disposed on the same side of the first carrier layer 11. The sealing structure 15 is disposed between the second conducting layer 17 and the adhesive layer 16 for forming the compartment 14 therebetween. That is, the compartment 14 is formed on the adhesive layer 16. The adhesive layer 16 could be made of UV-curable resin or thermosetting resin.

Moreover, the sonic touch module 1j further comprises a second carrier layer 111, a third conducting layer 19, another compartment 141 and another sealing structure 151 respectively from bottom to top. The another compartment 141 and an additional sealing structure 151 are disposed on the bottom side of the first vibration layer 12, and the first and second carrier layer 11, 111 are opposite to each other. To name from top to bottom, the sonic touch module 1j comprises the first vibration layer 12, the sealing structure 151, the third conducting layer 19 and the second carrier layer 111. Further, the sealing structure 151 is disposed between the first vibrating layer 12 and the third conducting layer 19 for forming the compartment 141 therebetween. The second or the third conducting layers 17, 19 comprise a continuous conducting layer or a non-continuous patterned conducting layer. In the present embodiment, the second and the third conducting layers 17, 19 are continuous conducting layers. The second conductive layer 17 could be a sonic wave sensor for sensing the vibration of sonic wave, and could be made of conductive material, composite material or dielectric material. Besides the sonic wave sensor (i.e., the second conductive layer 17) comprises electrode(s) disposed on one or two sides thereof, and the electrodes could be continuous or a non-continuous conducting pattern, which is not limited herein. The materials of the second and the third conducting layers 17, 19 are similar to that of the first conducting layer 13, therefore be omitted for clarity and conciseness.

The first vibration layer 12 could laminate on the first carrier layer 11 and directly contacts or adhesive via adhesive layer to the bottom surface of the first carrier layer 11. Besides, in this embodiment, the compartment 14 and the compartment 141 does not include any supporting structure, but in other aspect, the compartment 14 or/and the compartment 141 could include at least one supporting structure (the supporting structure 18 as shown in FIG. 1F.)

First, in FIG. 1J, take sonic wave sensing function (such as sonic sensing device) as an example, the sonic touch module 1j further comprises the first conducting layer 13, a first vibration layer 12, a second conducting layer 17 (sonic sensor), a stealing structure 15 and a compartment 14. When the second conducting layer 17 (sonic sensor) receives surrounding sound waves, the second conducting layer 17 would vibrate correspondingly (the compartment 14 further provides a vibration space). The sonic sensor could transfer the vibration into current accordingly, which these currents would then be transferred by a voice identifying module (not shown) to digital signals in order to let the sonic touch module 1j embodies voice receiving function similar to the microphone.

Secondly, as for sonic motivating function (such as sonic motivator), when the first and third conducting layers 13, 19 respectively receive different current signals, the first vibrating layer 12 (more specific, the electrets) would vibrate correspondingly, and export sonic wave corresponding to the vibration (the compartment 14 further provides a vibration space). By the above arrangements, the sonic touch module 1j could embody voice emissive function similar to the speaker.

Last but not least, below would give further details of the touch sensing function of the sonic touch module 1j. When fingers of the user or any object contact or touch any position on the second conducting layer 17, the capacitive between the first and the second conducting layer 13, 17 of the touch position would vary. By calculating the change of capacitive, the touch position of the fingers or object would be verified. Further, in another aspect of the present invention, the touch sensing could be other than capacitive type, it could be sliding or wiping type, knocking type or other equivalent touch sensing type, and it could be single-touch or multi-touch type.

Figure 1K:
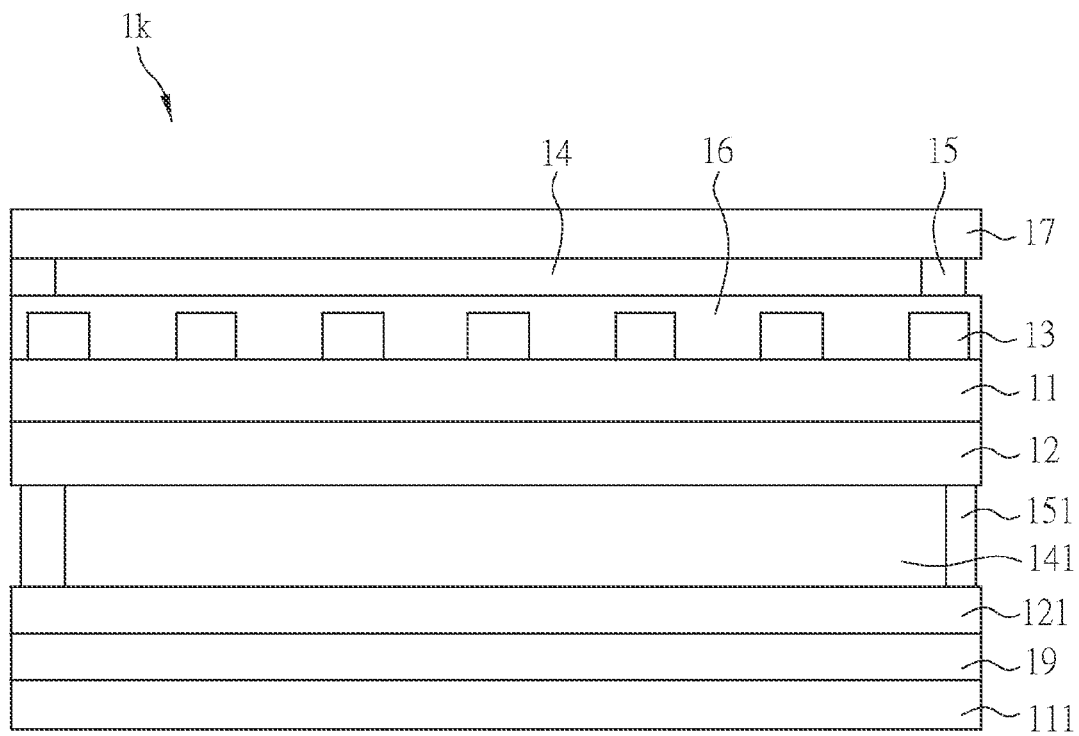

Please refer to FIG. 1K, the crucial different between the sonic touch module 1k and the sonic touch module 1j is that the sonic touch module 1k further comprises a second vibrating layer 121, which is disposed opposite to the first vibrating layer 12. The third conducting layer 19 is sandwiched between the second vibration layer 121 and the second carrier layer 111. The sealing structure 151 is disposed between the first and the second vibrating layers 12, 121 for forming the compartment 141 therebetween. In another aspect, the compartments 14, 141 of the sonic touch module 1k could also comprise a supporting structure. The detailed descriptions of the sonic touch module 1k of are similar to the sonic touch module 1j, therefore would be omitted for clarity and conciseness.

Figure 2A:
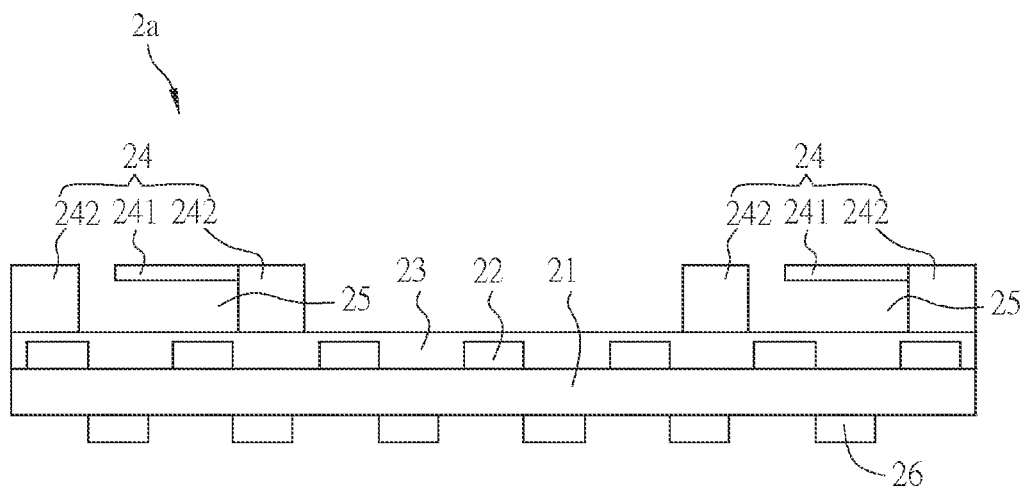
FIG. 2A is a schematic view of a second embodiment of a sonic touch module of the present invention.

Next, please refer to FIG. 2A, which shows a schematic view of a second embodiment of a sonic touch module 2a of the present invention.

The sonic touch module 2a comprises a carrier layer 21, a first conducting layer 22, an adhesive layer 23 and at least one vibrating layer 24. The sonic touch module 2a further comprises a compartment 25 and a second conducting layer 26. As shown in FIG. 2A, although the present embodiment shows two sets of vibration layers 24; in other aspects, it could be also possible to apply only one set of vibration layer 24 in the sonic touch module 2a.

The first conducting layer 22 is disposed on the carrier layer 21. The adhesive layer 23 is disposed on covers the first conducting layer 22 and contacts the first carrier layer 11. The vibration layer 24 and the adhesive layer 23 formed the compartment 25. In this embodiment, the first conducting layer 22 is disposed on the carrier layer 21, and is connected with the vibration layer 24 via wire or by electromagnetic coupling means. The first conducting layer 22 and the vibration layer 24 are disposed on the same side of the carrier layer 21. Besides, the first conducting layers 22 comprises a non-continuous patterned layer (patterned electrode), and the adhesive layer 23 directly connects with the carrier layer 21 and covers the first conducting layer 21. The detailed descriptions of the carrier layer 21 and the first conducting layer 22 of are similar to the first carrier layer 11 and the first conducting layer 13 in the first embodiment therefore would be omitted for clarity and conciseness. Hereby, the adhesive layer 23 could be made of UV-curable resin or thermosetting resin, and being laminated or coated on the first conducting layer 22 for providing a flat and laminated interface. The surface of the adhesive layer could include a silicon dioxide or polymer (not shown), such as PER or PPMA, etc.

The vibration layer 24 further comprises a sonic sensor 241 and a sonic motivator 242. The sonic sensor 241 is coupled with the sonic motivator 242, and the sonic motivator 242 is coupled with the adhesive layer 23. In the present embodiment, presents one sonic sensor 241 with two sonic motivators 242, and the sonic sensor 241, two sonic motivators 242 and the adhesive layer 23 formed a compartment 25, which is an opened compartment. The sonic sensor 241 and the sonic motivators 242 on the left side formed a gap therebetween. The sonic sensor 241 in this embodiment is a cantilever sensor, and is made of conductive material, composite material or dielectric material for sensing the vibration of sonic wave. The sonic motivators 242 for vibrating corresponding to different current signals could be made by piezo electric material (light transmissive or opaque) or composite materials mentioned in the description of the first embodiment. Further, if the sonic sensor 241 and the sonic motivators 242 are made of piezo electric material, the surface of sonic sensor 241 and the sonic motivators 242 could comprise the electrode(s) disposed on one or two sides thereof, and the electrodes could be continuous or a non-continuous conducting pattern, which is not limited herein. The second conducting layer is disposed on the bottom surface of the carrier layer 21, and the first and the second conducting layer 22, 26 are respectively disposed on the different and opposite side of the carrier layer 21. The second conducting layer 26 could be a continuous or a non-continuous patterned conducting layer, which the present embodiment shows a non-continuous conducting layer (electrode).

The sonic touch module 2a comprises a sonic wave sensing function (e.g., sonic sensor, such as microphone), a sonic motivating function (e.g., sonic motivator, such as speaker) and a touch sensing function (e.g., touch panel). The details description of the sonic wave sensing function, the sonic motivating function and the touch sensing function would be introduced below.

First as shown in FIG. 2A, take sonic wave sensing function as an example, when sonic sensor 241 receives surrounding sound waves, different waves would generates different vibrations accordingly. Then different vibrating frequencies would generate different currents (via the first and the second conducting layer 22, 26) accordingly, and these currents would be transferred by a voice identifying module (not shown) to digital signals in order to let the sonic touch module 2a embodies voice receiving function similar to the microphone. Additionally, the compartment 25 could further provide a vibration space for the sonic sensor 241.

Secondly, as for sonic motivating function, when the sonic motivator 242 receives two different current signals (the first and the second conducting layer 22, 26 input the current signals), the sonic motivator 242 would vibrate correspondingly, and export sonic wave corresponding to the vibration. By the above arrangements, the sonic touch module 2a could embody voice emissive function similar to the speaker.

Last but not least, below would give further details of the touch sensing function of the sonic touch module 2a. When fingers of the user or any object contact or touch any position of the two electrodes gathering of the first and the second conducting layer 22, 26, the capacitive of the touch position would vary. By calculating the change of capacitive, the touch position of the fingers or object would be verified. Further, in other aspect of the present invention, the touch sensing could be other than capacitive type, it could be sliding or wiping type, knocking type or other equivalent touch sensing type, and it could be single-touch or multi-touch type.

Figure 2B:
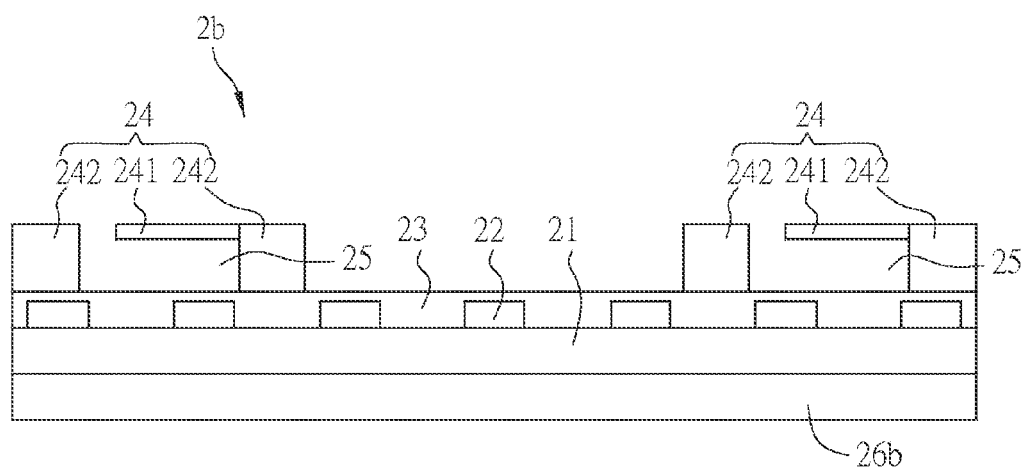
FIG. 2B to FIG. 2D are schematic views showing different sonic touch modules of the second embodiment of the present invention.
Figure 2C:
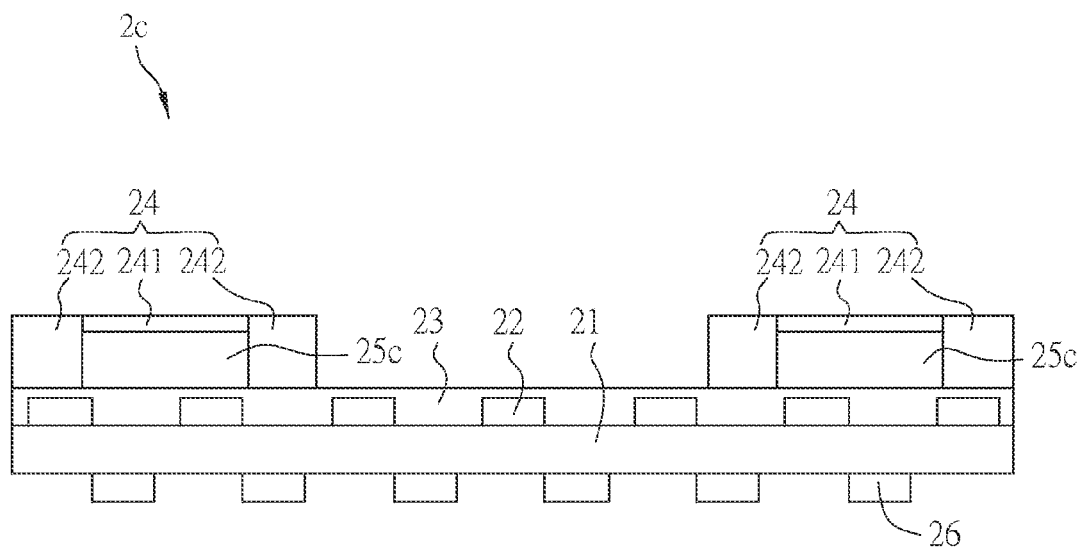
Figure 2D:
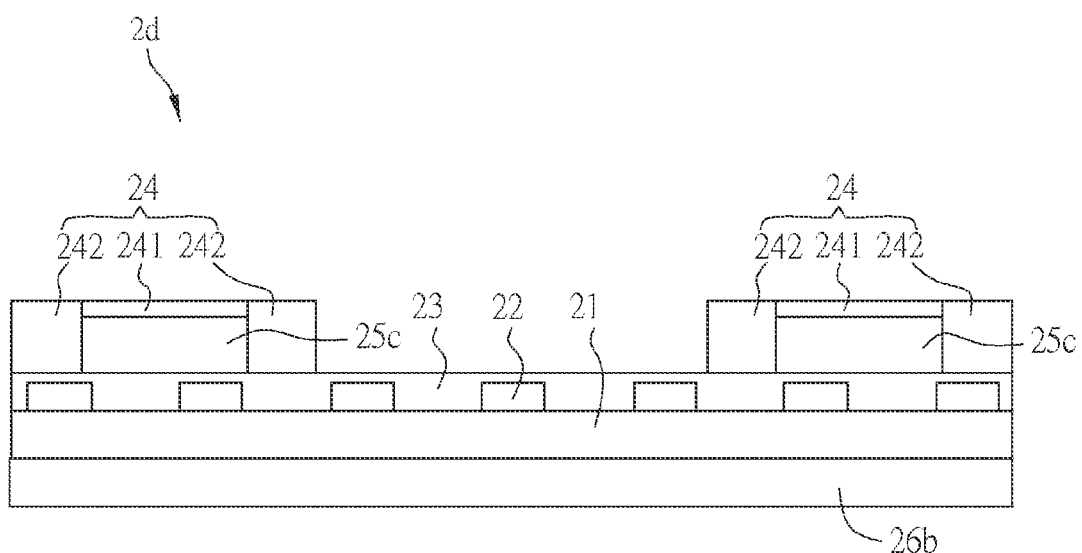

Next, please refer to FIG. 2B to 2D respectively show schematic views of different sonic touch modules 2b to 2d of the second embodiment of the present invention.

As depicted in FIG. 2B, the essential different between the sonic touch module 2b and the sonic touch module 2a of FIG. 2A is that the second conducting layer 26b of the sonic touch module 2b is a continuous conducting layer. Other details descriptions of the sonic touch module 2b could be reference to the sonic touch module 2a, therefore would be omitted for clarity and conciseness.

As depicted in FIG. 2C, the essential different between the sonic touch module 2c and the sonic touch module 2a of FIG. 2A is that the sonic sensor 241, two sonic motivator 242 and the adhesive layer 23 could form a closed compartment 25c. That is, there would be no gap between the sonic sensor 241 and the sonic motivators 242 on the left side of it. Other details descriptions of the sonic touch module 2c could be reference to the sonic touch module 2a, therefore would be omitted for clarity and conciseness.

As depicted in FIG. 2D, the essential different between the sonic touch module 2d and the sonic touch module 2c is that the second conducting layer 26d of the sonic touch module 2d is a continuous conducting layer. Other details descriptions of the sonic touch module 2d could be reference to the sonic touch module 2c, therefore would be omitted for clarity and conciseness.

Figure 3:
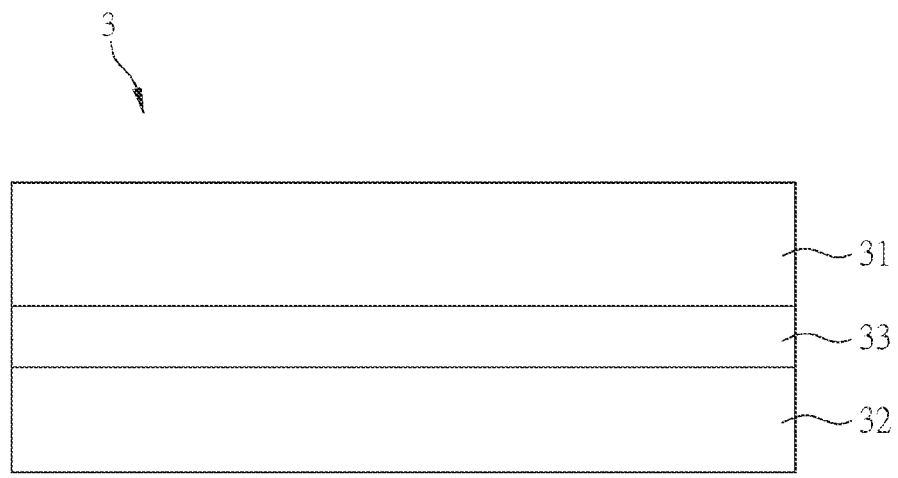
FIG. 3 is a schematic side view of an embodiment of a MIMO sonic touch panel of the present invention.

Please refer to FIG. 3, it is a schematic side view of an embodiment of a MIMO sonic touch panel 3 of the present invention.

The MIMO sonic touch panel 3 has at least one sonic touch module 31 and a display module 32, which disposed opposite to the sonic touch module 31. In the present embodiment, between the sonic touch module 31 and the display module 32 is an adhesive layer 33, which combines sonic touch module 31 and the display module 32 to form the MIMO sonic touch panel 3 (or sonic touch device). The sonic touch module 31 comprises a sonic wave sensing function (e.g., sonic sensor, such as microphone), a sonic motivating function (e.g., sonic motivator, such as speaker) and a touch sensing function (e.g., touch panel), with the display module could formed the MIMO sonic touch panel 3. Besides, on the displaying plane of the MIMO sonic touch panel 3 has a covering glass (not shown) for the purpose of protection. Further, the sonic touch module 31 could any one of the abovementioned MIMO sonic touch panel 1a~1k of the first embodiment of the MIMO sonic touch panels 2a~2d in the second embodiment. Therefore, the details description of the sonic touch module 31 would be omitted. It should be noted that if the MIMO sonic touch panel 3 comprises multiple sonic touch modules 31, the sonic touch modules 31 could share the carrier layer (i.e., the first or the second carrier layers that mentioned in the first and the second embodiment). In other way of speaking, multiple elements (such as vibration layer, conducting layer, compartment, sealing structure, etc.) could be planted on the carrier layer, and with multiple carrier layer could formed into a MIMO sonic touch panel 3. The area of sonic sensing/sonic motivating zone and the area of the touch sensing could be same or not.

Figure 4A:
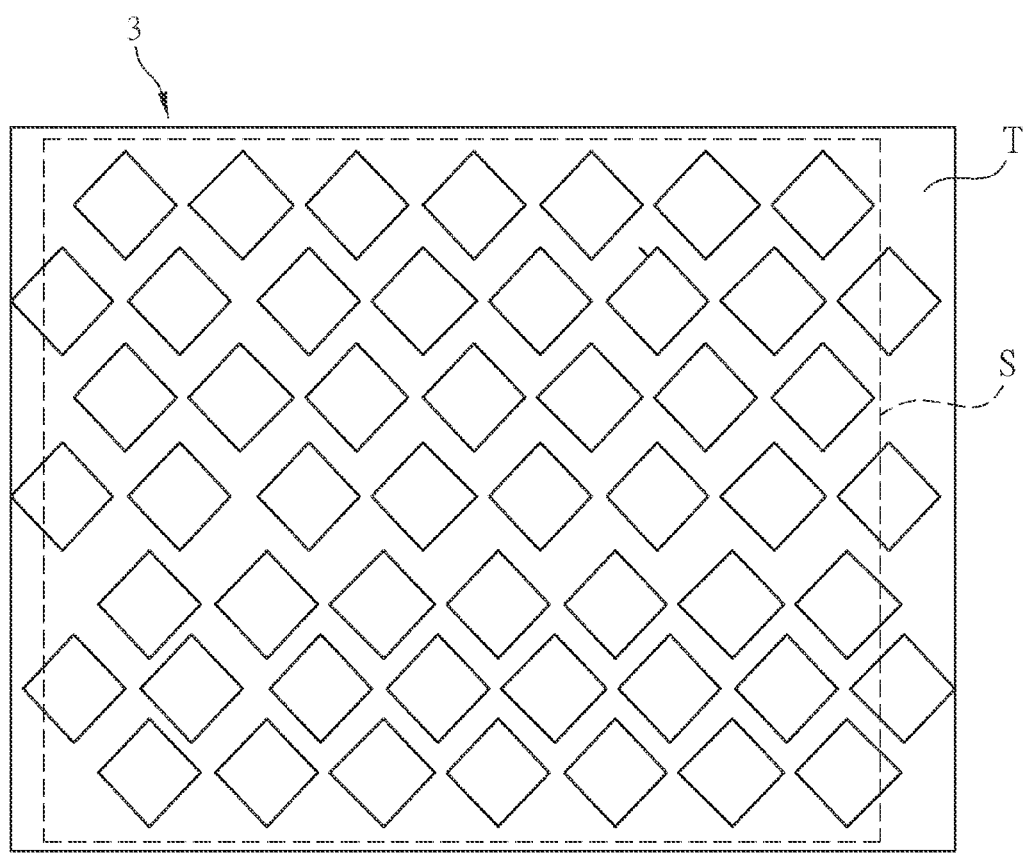
FIG. 4A to FIG. 4C are schematic top views showing different sonic touch panels of FIG. 3.
Figure 4B:
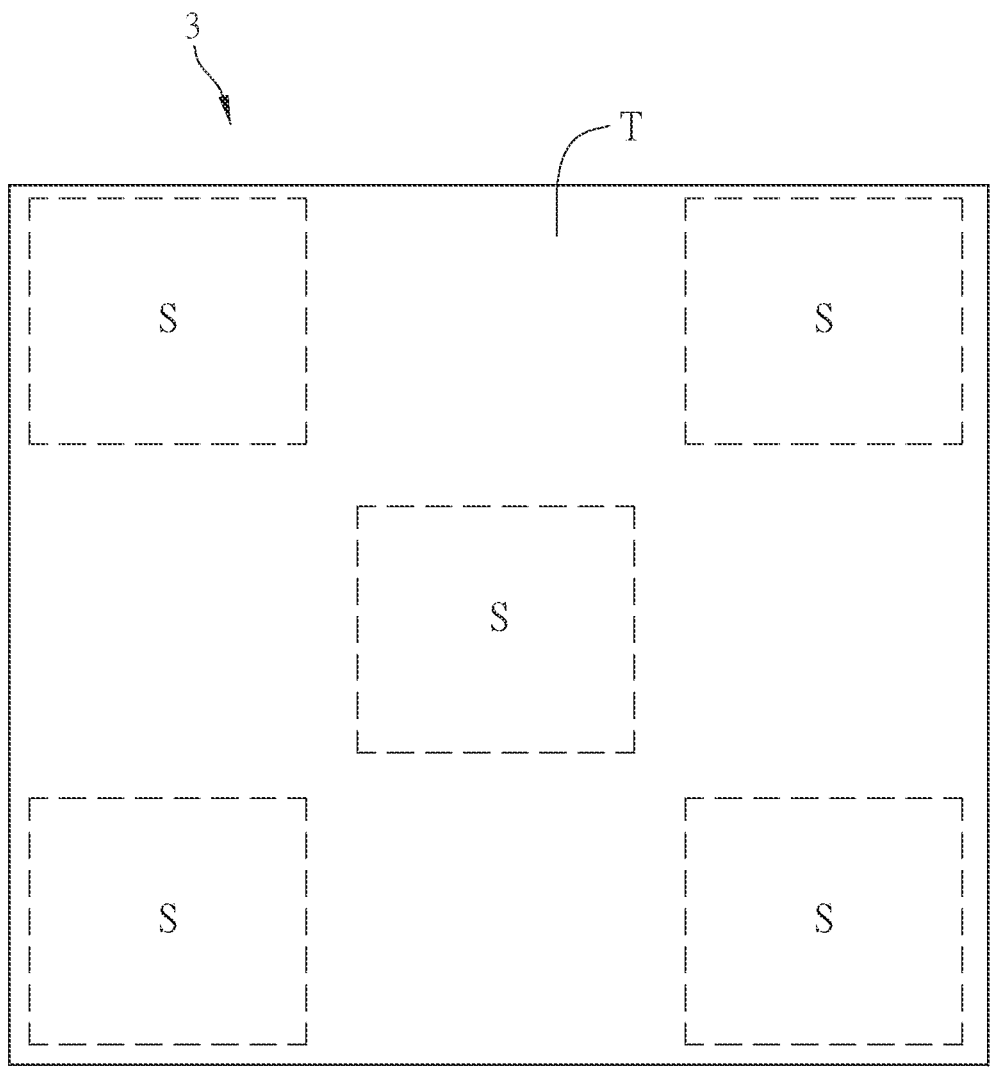
Figure 4C:
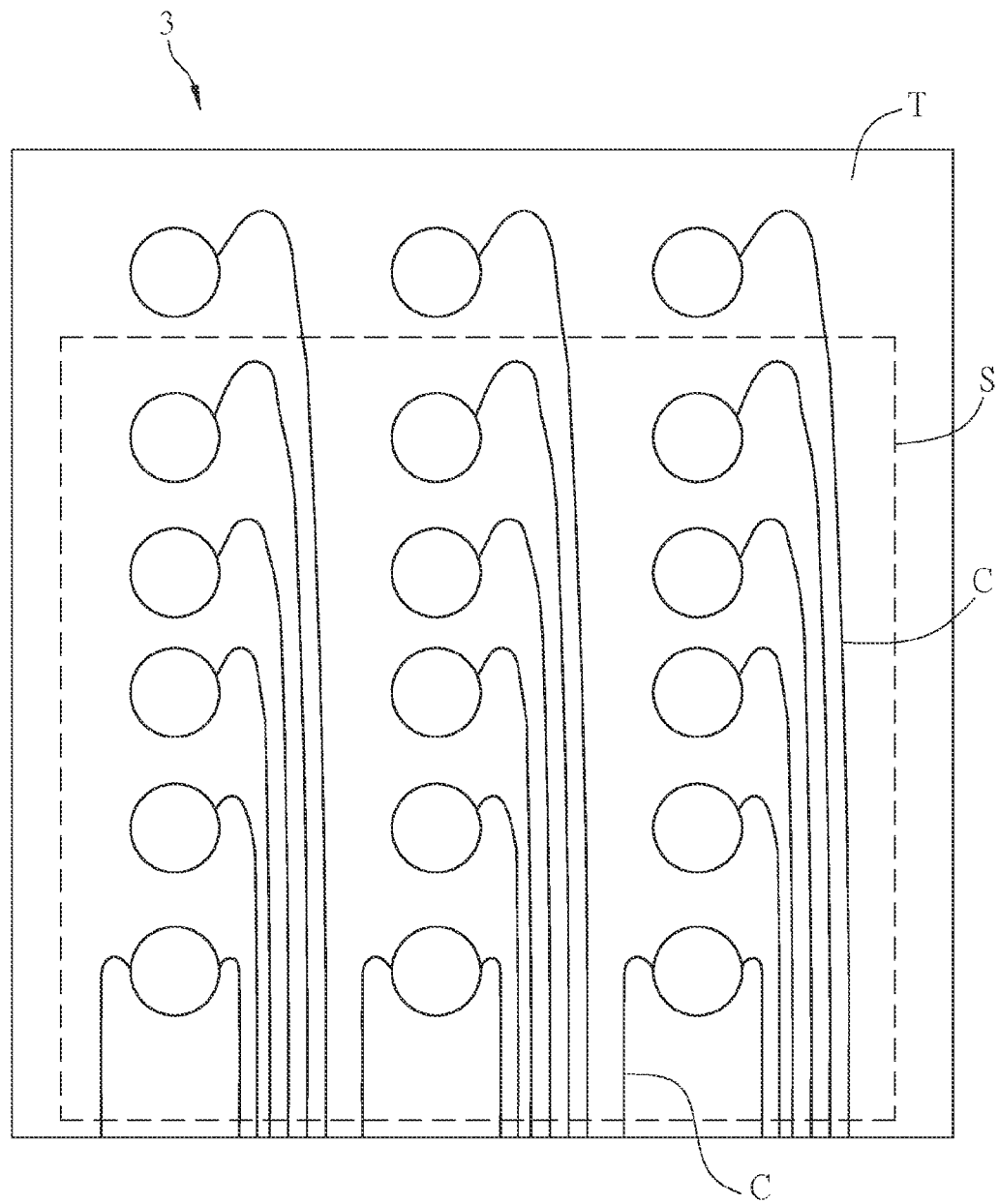

Please refer to FIG. 4A to FIG. 4C. FIG. 4A to FIG. 4C respectively show schematic top views of different sonic touch panels of FIG. 3.

As shown in FIG. 4A, the top surface of the MIMO sonic touch panel 3 includes a touch/display zone T and a sonic sensing/motivating zone S, which the area of the touch/display zone T and the sonic sensing/motivating zone S could be same or not. The touch/display zone T could be a resistance-type or a capacitive-type touch sensing and display panel. When fingers of the user or any object contact or touch any position on touch/display zone T, it could be verified by touch/display zone T. Further, in another aspect of the present invention, the touch sensing could be other than capacitive or resistance type, it could be sliding or wiping type, knocking type or other equivalent touch sensing type, and it could be single-touch or multi-touch type. Moreover, the sonic sensing/motivating zone S could detect sonic waves (function similar to microphone) and output sound wave (function similar to speaker). The processes of detecting and outputting sound waves are similar as the above-mentioned.

Next, please refer to FIG. 4B, the top surface of the MIMO sonic touch panel 3 includes multiple touch/display zones T and multiple sonic sensing/motivating zones S (five touch/display zones T and five sonic sensing/motivating zones S are shown). The overall area of the touch/display zones T on the upper surface is larger than the sonic sensing/motivating zones S, and the sonic sensing/motivating zones S is disposed inside the touch/display zones T. The touch/display zones T could be a resistance-type or a capacitive type touch sensing panel, and the touch sensing could be other than capacitive type, it could be sliding or wiping type, knocking type or other equivalent touch sensing type, and it could be single-touch or multi-touch type. Moreover, the sonic sensing/motivating zone S could detect sound waves (function similar to microphone) and output sound wave (function similar to speaker). The processes of detecting and outputting sound waves are similar as the above-mentioned.

Please refer to FIG. 4C, the top surface of the MIMO sonic touch panel 3 includes multiple touch/display zones T and multiple sonic sensing/motivating zones S (five touch/display zones T and five sonic sensing/motivating zones S are shown). The overall area of the touch/display zones T on the upper surface is larger than the sonic sensing/motivating zones S, and the sonic sensing/motivating zones S is disposed inside the touch/display zones T. Each circle depicted in FIG. 4C represents a sonic sensor/motivator, and each of the sonic sensors/motivators are connected to other elements via a conductive wire C. For instance, could be electrically connected to the processing module or voice identifying module. The conductive wire C could transfer current signals, including current signals of sound and touch sensing, in order to input the external signal into the sonic sensors/motivators, or vice versa. The touch/display zones T could be a resistance-type or a capacitive type touch sensing panel, and the touch sensing could be other than capacitive type, it could be sliding or wiping type, knocking type or other equivalent touch sensing type, and it could be single-touch or multi-touch type. Moreover, the sonic sensing/motivating zone S could detect sound waves (function similar to microphone) and output sound wave (function similar to speaker). The processes of detecting and outputting sound waves are similar as the above-mentioned.

Figure 5:
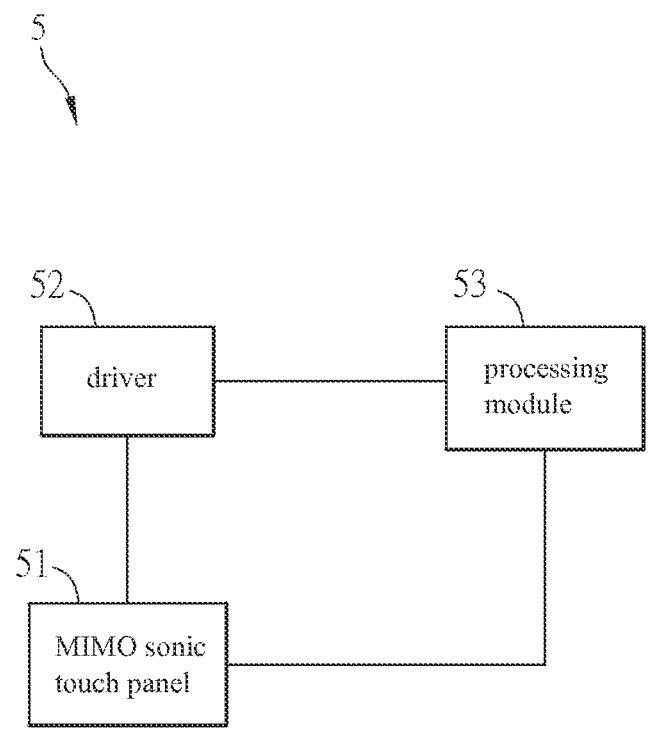
FIG. 5 is a schematic block diagram of a user-computer interface of the present invention.

FIG. 5 shows a schematic block diagram of a user-computer interface 5 of the present invention. In brief, the user-computer interface 5 is a multi-input and multi-output (MIMO) system, which could be apply could be applied on a portable electronic device (such as laptop, tablet computer, smart phone, PDA or global positioning system), a desktop electronic device (desktop computer), an intelligence life experience or an intelligence television or other electric devices (vehicle computer system, vehicle distance monitoring system or a feed-back control system).

The user-computer interface 5 comprises a MIMO sonic touch panel 51, a driver 52 and a processing module 53. The MIMO sonic touch panel 51 includes at least one sonic touch module and a display module, being disposed opposite to the sonic touch module (not shown). The processing module 53 couples with the MIMO sonic touch panel 51 and the driver 52, and the processing module 53 drives the MIMO sonic touch panel 51. The MIMO sonic touch panel 51 could any one of the abovementioned MIMO sonic touch panels 1a~1k of the first embodiment of the sonic touch modules 2a~2d in the second embodiment. Wherein, the MIMO sonic touch panel 51 could input and output multiple data, and those data could be process, calculate and identify by the processing module 53. The driver 52 could drive or activate the MIMO sonic touch panel 51, such as displaying images. Besides, the user-computer interface 5 comprises a user interface, UI (not shown). Preferably, the user interface is a graphic user interface, GUI.

Figure 6A:
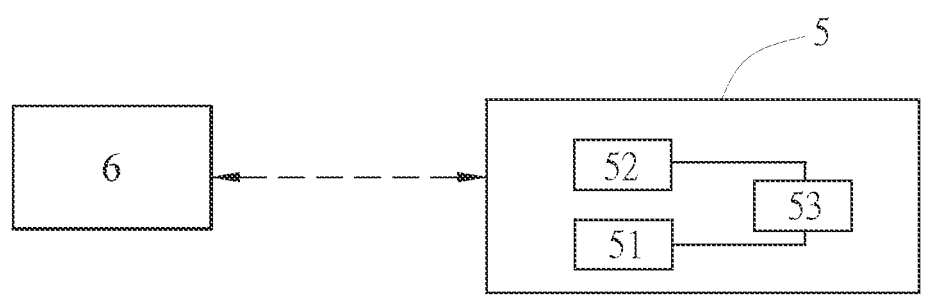
FIG. 6A and FIG. 6B are schematic views showing different application of the user-computer interface of the present invention.

As shown in FIG. 6A, when applying the user-computer interface 5 vehicle computer system, the external device 6 (such as wireless workshop) could deliver data signals (such as control command, sound or image data) via wireless (or wire) to the processing module 53 of the user-computer interface 5, thus the driver 52 would drive the MIMO sonic touch panel 51 to display and output (in images or sound). Otherwise, the MIMO sonic touch panel 51 could also receive touch sensing or sonic signals, and these signals could be progressed by the processing module 53. Then, the progressed signals would be feed-back to the external device 6 (such as wireless workshop), for realizing the objections of fault analyze, signal transmitting and communication.

Figure 6B:
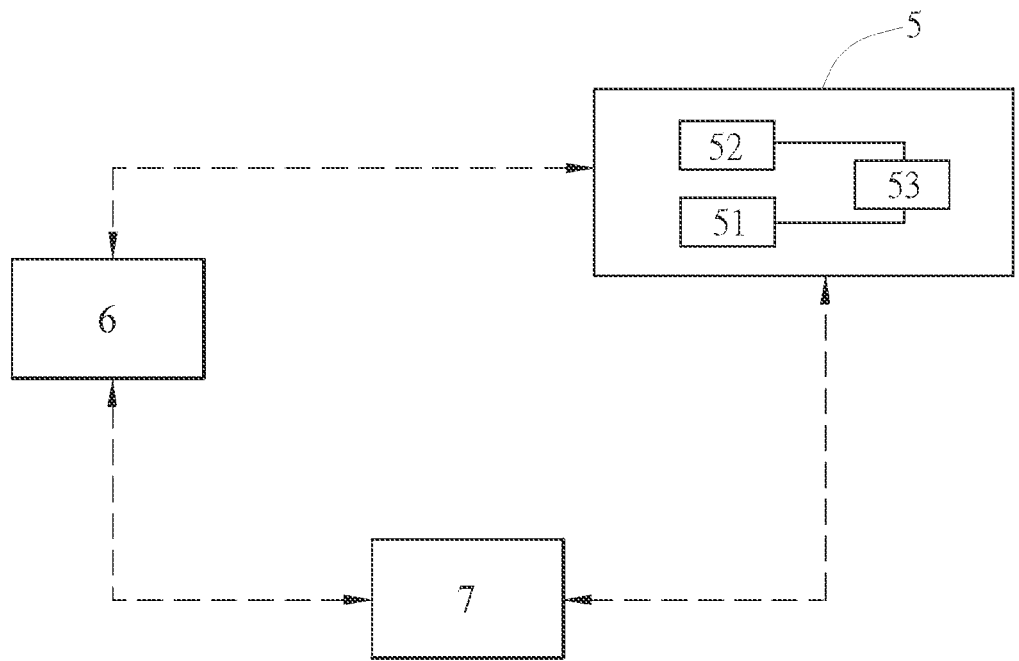

As shown in FIG. 6B, when applying the user-computer interface 5 vehicle distance monitoring system. The vehicle distance monitoring system comprises a user-computer interface 5, a wireless workshop 6 and a vehicle center 7. The user-computer interface 5 could deliver data signals to the vehicle center 7 via the wireless workshop 6, and vehicle center 7 could feedback the progressed data signals to the user-computer interface 5 via the wireless workshop 6. Therefore, the objections of fault analyze, signal transmitting and communication could be realized.

Figure 7:
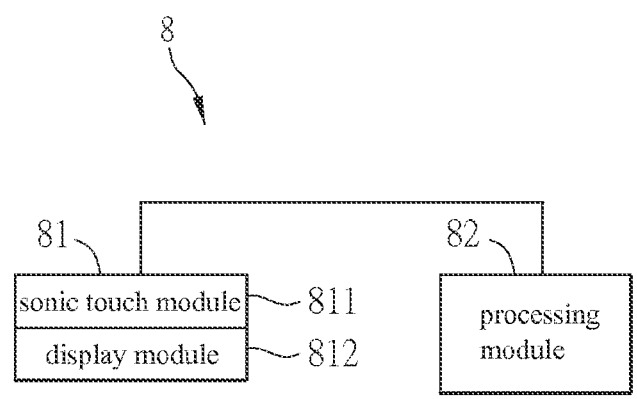
FIG. 7 is a schematic block diagram of a MIMO smart sound potential server of the present invention.

FIG. 7 shows a schematic block diagram of a MIMO smart sound potential server 8 of the present invention.

The MIMO smart sound potential server 8 includes a MIMO sonic touch panel 81 and a processing module 82. The MIMO smart sound potential server 8 could be applied on a portable electronic device, a desktop electronic device, an intelligence life experience or an intelligence television, but not limited to.

The MIMO sonic touch panel 81 comprises at least one sonic touch module 811, for detecting at least one surrounding background noise or a user's sound potential. The user's sound potential could be is chosen from the gathering of the volume, the linguistic, voiceprint and/or pitch (high or low) of the user and the overall surrounding sound spectrum tracking. By this information, the processing module 82 could interpreted this information and understand the need of the user or the pattern or trend of the user, in order to provide a more suitable reaction.

The sonic touch module 811 at least comprises a vibrating layer, a compartment and an adhesive layer. The sonic touch module 811 also comprises a sonic sensor and a sonic motivator, wherein the sonic sensor is coupled with the sonic motivator and the sonic motivator is coupled with the adhesive layer. The sonic sensor, a sonic motivator and the adhesive layer formed the sonic touch module 811. The sonic sensor and a sonic motivator could be made from piezo electric material, composite material or dielectric material. Further, the sonic touch module 811 could any one of the MIMO sonic touch panels 2a~2d in the second embodiment. Therefore, the details description of the sonic touch module 31 would be omitted.

The MIMO sonic touch panel 81 further comprises a display module 812, which is disposed opposite to the sonic touch module 811. In the present embodiment, between the sonic touch module 811 and display module 812 is an adhesive layer (not shown), which combines the sonic touch module 811 and display module 812 to form the MIMO sonic touch panel 81. The sonic touch module 811 could detect at least one surrounding background noise or a user's sound potential and comprises a sonic wave sensing function (e.g., sonic sensor, such as microphone), a sonic motivating function (e.g., sonic motivator, such as speaker) and a touch sensing function (e.g., touch panel), with display module 812 could formed the MIMO sonic touch panel 81. Besides, on the displaying plane of the MIMO sonic touch panel 81 has a covering glass (not shown) for the purpose of protection. The display module 812 would display a concerning information to the user, which the concerning information is formed depending on the at least one surrounding background noise or the user's sound potential. The concerning information for the user could be an emergency rescue information.

The processing module 82 couples with the MIMO sonic touch panel 81. When the user receiving a call, the processing module 82 would output an optimized sound effect according to the at least one surrounding background noise or the user's sound potential. The optimized sound effect is a Signal/Noise ratio sound effect. The processing module 82 could further comprise a driver to provide an optimized sound effect.

In other way of speaking, the MIMO smart sound potential server 8 of the present invention could detect at least one surrounding background noise or a user's sound potential by the MIMO sonic touch panel 81, and provide a Signal/Noise ratio sound effect by the processing module 82. If the MIMO smart sound potential server 8 is a smart phone, when the user receives a call during the middle of a concert, the MIMO smart sound potential server 8 would thus adjust accordingly and provide the optimized volume for the speaker and calling ring. Therefore, the would be no need for user to adjust the volume himself or herself, in addition, the MIMO smart sound potential server 8 might even replace the volume bottom on the smart phone. With fewer bottoms, the design of the smart phone could be more flexible and the weight could be decrease. Or if the user encounters accident, the MIMO smart sound potential server 8 could automatically detect the sound potential of the user and provides information to the police or family of the user. This might provide a real time rescue need. Or if the MIMO smart sound potential server 8 sense sadness, or suicide circumstance, the MIMO smart sound potential server 8 could provide smooth or comfort songs or display positive information through smart phone to ease and courage the emotion of the user.

In summary, the present invention provides a MIMO sonic touch panel a MIMO smart sound potential server, which combine the sonic sensing, sonic motivating, information displaying and touch sensing within a module, a panel and a server. Therefore could create a new experience and new application, simplify volume, the structure and lower the cost of the MIMO sonic touch panel and smart sound potential server. Accordingly, the present invention could provide a better, flexible, active and effective smart device for the user.

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. A multi-input and multi-output (MIMO) sonic touch panel comprising:
    at least one sonic touch module comprising a first carrier layer, a first vibrating layer, a first conducting layer, an adhesive layer, a compartment, a second conducting layer and a sealing structure, wherein the first vibrating layer is disposed on the first carrier layer, the first conducting layer is disposed on the first carrier layer or the first vibrating layer and is coupled with the first vibrating layer, the first conducting layer and the first vibrating layer are disposed on the same side or on the opposite sides of the first carrier layer, the adhesive layer covers the first conducting layer, the compartment is formed on the adhesive layer, the second conducting layer is disposed on the adhesive layer, the compartment is disposed between the second conducting layer and the adhesive layer, and the compartment is formed between the sealing structure, the second conducting layer and the adhesive layer; and
    a display module disposed opposite to the sonic touch module.

2. The multi-input and multi-output (MIMO) sonic touch panel as claimed in claim 1, wherein the sonic touch module further comprises an additional compartment, an additional sealing structure and a third conducting layer, the additional sealing structure is disposed between the first vibrating layer and the third conducting layer for forming the additional compartment therebetween.

3. The multi-input and multi-output (MIMO) sonic touch panel as claimed in claim 1, wherein the first or the second conducting layer comprises a continuous conducting layer or a non-continuous patterned conducting layer.

4. The multi-input and multi-output (MIMO) sonic touch panel as claimed in claim 1, wherein the sonic touch module comprises a sonic wave sensing function, a sonic motivating function and a touch sensing function.

5. A multi-input and multi-output (MIMO) smart sound potential server comprising:
    an MIMO sonic touch panel comprising at least one sonic touch module for at least detecting a surrounding background noise or a user's sound potential; and
    a processing module coupling with the MIMO sonic touch panel, wherein when the user receives a call, the processing module outputs an optimized sound effect according to the surrounding background noise or the user's sound potential;
    wherein the sonic touch module comprises a first carrier layer, a first vibrating layer, a first conducting layer, an adhesive layer, a compartment, a second conducting layer and a sealing structure,
    wherein the first vibrating layer is disposed on the first carrier layer, the first conducting layer is disposed on the first carrier layer or the first vibrating layer and is coupled with the first vibrating layer, the first conducting layer and the first vibrating layer are disposed on the same side or on the opposite sides of the first carrier layer, the adhesive layer covers the first conducting layer, the compartment is formed on the adhesive layer, the second conducting layer is disposed on the adhesive laver, the compartment is disposed between the second conducting layer and the adhesive layer, and the compartment is formed between the sealing structure, the second conducting layer and the adhesive layer.

6. The multi-input and multi-output (MIMO) smart sound potential server as claimed in claim 5, wherein the processing module at least comprises a driver for providing the optimized sound effect.

7. The multi-input and multi-output (MIMO) smart sound potential server as claimed in claim 5, wherein the MIMO smart sound potential server is applied to a portable electronic device, a desktop electronic device, an intelligence life experience or an intelligence television.

8. The multi-input and multi-output (MIMO) smart sound potential server as claimed in claim 5, wherein the user's sound potential is selected from a group consisting of volume, linguistic, voiceprint and/or pitch of the user and the overall surrounding sound spectrum tracking 9. The multi-input and multi-output (MIMO) smart sound potential server as claimed in claim 5, wherein the MIMO sonic touch panel further comprises:
 a display module disposed opposite to the sonic touch module.

10. The multi-input and multi-output (MIMO) smart sound potential server as claimed in claim 9, wherein the display module displays a concerning information, which is formed depending on the surrounding background noise or the user's sound potential, to the user.

11. The multi-input and multi-output (MIMO) smart sound potential server as claimed in claim 10, wherein the concerning information for the user comprises an emergency rescue information.

12. The multi-input and multi-output (MIMO) sonic touch panel as claimed in claim 1, wherein the sonic touch module further comprises an additional compartment, an additional sealing structure, a second vibrating layer and a third conducting layer, the additional sealing structure is disposed between the first vibrating layer and the second vibrating layer for forming the additional compartment therebetween, and the second vibrating layer is disposed on the third conducting layer.

13. The multi-input and multi-output (MIMO) sonic touch panel as claimed in claim 12, wherein the first or the second vibrating layer comprises an electret.

14. The multi-input and multi-output (MIMO) sonic touch panel as claimed in claim 12, wherein the sonic touch module further comprises a second carrier layer, and the third conducting layer is disposed on the second carrier layer.

15. The multi-input and multi-output (MIMO) sonic touch panel as claimed in claim 2, wherein the sonic touch module further comprises a second carrier layer, and the third conducting layer is disposed on the second carrier layer.

16. The multi-input and multi-output (MIMO) smart sound potential server as claimed in claim 5, wherein the sonic touch module further comprises an additional compartment, an additional sealing structure and a third conducting layer, the additional sealing structure is disposed between the first vibrating layer and the third conducting layer for forming the additional compartment therebetween.

17. The multi-input and multi-output (MIMO) smart sound potential server as claimed in claim 16, wherein the sonic touch module further comprises a second carrier layer, and the third conducting layer is disposed on the second carrier layer.

18. The multi-input and multi-output (MIMO) smart sound potential server as claimed in claim 5, wherein the sonic touch module further comprises an additional compartment, an additional sealing structure, a second vibrating layer and a third conducting layer, the additional sealing structure is disposed between the first vibrating layer and the second vibrating layer for forming the additional compartment therebetween, and the second vibrating layer is disposed on the third conducting layer.

19. The multi-input and multi-output (MIMO) smart sound potential server as claimed in claim 18, wherein the first or the second vibrating layer comprises an electret.

20. The multi-input and multi-output (MIMO) smart sound potential server as claimed in claim 18, wherein the sonic touch module further comprises a second carrier layer, and the third conducting layer is disposed on the second carrier layer.

\* \* \* \* \*